United States Patent
Huber et al.

(10) Patent No.: US 9,784,559 B2
(45) Date of Patent: Oct. 10, 2017

(54) SWEPT SOURCE OCT SYSTEM AND METHOD WITH PHASE-LOCKED DETECTION

(71) Applicant: Ludwig Maximilians Universität, München (DE)

(72) Inventors: Robert Alexander Huber, Schnaitsee (DE); Thomas Klein, Munich (DE); Wolfgang Wieser, Munich (DE)

(73) Assignee: Ludwig-Maximilians-Universität München, München (DE)

( * ) Notice: Subject to any disclaimer, the term of this patent is extended or adjusted under 35 U.S.C. 154(b) by 61 days.

(21) Appl. No.: 14/386,672

(22) PCT Filed: Mar. 21, 2013

(86) PCT No.: PCT/EP2013/000865
§ 371 (c)(1),
(2) Date: Jan. 5, 2015

(87) PCT Pub. No.: WO2013/139480
PCT Pub. Date: Sep. 26, 2013

(65) Prior Publication Data
US 2015/0109621 A1    Apr. 23, 2015

(30) Foreign Application Priority Data

Mar. 21, 2012  (DE) .................. 10 2012 102 424
Feb. 4, 2013   (DE) .................. 10 2013 101 094

(51) Int. Cl.
*G01B 9/02* (2006.01)
(52) U.S. Cl.
CPC ....... *G01B 9/02004* (2013.01); *G01B 9/0203* (2013.01); *G01B 9/02043* (2013.01); *G01B 9/02069* (2013.01); *G01B 9/02091* (2013.01)

(58) Field of Classification Search
None
See application file for complete search history.

(56) References Cited

U.S. PATENT DOCUMENTS

| 5,644,642 A | 7/1997 | Kirschbaum |
|---|---|---|
| 2006/0187537 A1 | 8/2006 | Huber et al. |

(Continued)

FOREIGN PATENT DOCUMENTS

| WO | WO-2006/058735 A1 | 6/2006 |
|---|---|---|
| WO | WO-2010/026197 A2 | 3/2010 |
| WO | WO-2011/033031 A1 | 3/2011 |

OTHER PUBLICATIONS

Wieser et al. "Multi-megahertz OCT: High quality 3D imaging at 20 million A-scans and 4.5 GVoxels per second." Optics express 18.14 (2010): 14685-14704.*

(Continued)

*Primary Examiner* — Shawn Decenzo
(74) *Attorney, Agent, or Firm* — Marshall, Gerstein & Borun LLP

(57) ABSTRACT

A swept source OCT system and related method are disclosed. The system comprises a control device for operating a tunable light source in response to an electronic sweep control signal such that the tunable light source carries out wave length sweeps with a repetition rate $f_{sweep}$, which depends on the frequency of the sweep control signal. The system further comprises a detection device for the time-resolved detection of an interference signal from a sample beam and a reference beam with the help of a detection cycle signal. The sweep control signal and the detection cycle signal are phase-locked, or means for creating a signal or signal sequence are provided, said signal or signal sequence being characterising for the frequency relationship and/or the relative phase position of the sweep control signal and detection cycle signal.

20 Claims, 11 Drawing Sheets

(56) References Cited

U.S. PATENT DOCUMENTS

| | | | |
|---|---|---|---|
| 2006/0279742 A1 | 12/2006 | Tearney et al. | |
| 2009/0046295 A1* | 2/2009 | Kemp | A61B 5/0066 356/479 |
| 2009/0174931 A1* | 7/2009 | Huber | H01S 3/06791 359/340 |
| 2010/0103964 A1 | 4/2010 | Huber | |
| 2011/0273667 A1 | 11/2011 | Knighton et al. | |
| 2013/0271772 A1* | 10/2013 | Johnson | G01B 9/02004 356/479 |

OTHER PUBLICATIONS

Adler et al., Phase sensitive optical coherence tomography using buffered Fourier Domain Mode Locked lasers at up to 370,000 scans per second, SPIE, (2007).

Blatter et al., Intrasweep phase-sensitive optical coherence tomography for noncontact optical photoacoustic imaging, Optics Letters, 70(21):4368-70 (Nov. 2012).

International Search Report, corresponding International Application No. PCT/EP2013/000865, mailed Jul. 17, 2013.

Sarunic et al., Instantaneous complex conjugate resolved spectral domain and swept-source OCT using 3x3 fiber couplers, Optics Express, 13(3):957-67 (Jan. 2005).

Biedermann et al., Real time en face Fourier-domain optical coherence tomography with direct hardware frequency demodulation, Optics Lett., 33(21):2556-8 (2008).

International Search Report for corresponding International Application No. PCT/EP2013/000866, mailed Jul. 5, 2013.

International preliminary report on patentability from international Application No. PCT/EP2013/000865 dated Oct. 2, 2014.

Podoleanu et al., Combinations of techniques in imaging the retina with high resolution, Progress in Retinal and Eye Research, 27(4):474-84 (2008).

Yasuno et al., In vivo high-contrast imaging of deep posterior eye by 1-um swept source optical coherence tomography and scattering optical coherence angiography, Optics Exp., 15(10):6127-31 (2007).

\* cited by examiner

SWEPT SOURCE OCT SYSTEM AND METHOD WITH PHASE-LOCKED DETECTION

FIELD OF THE INVENTION

The present invention pertains to the field of medical imaging. It particularly pertains to a swept-source OCT system and a swept-source OCT method, as well as an OCT-based photoacoustic detection method.

BACKGROUND AND RELATED PRIOR ART

Optical coherence tomography (OCT) is an optical method, by means of which 3D images of optically scattering media such as, for example, biological tissue can be recorded with a resolution in the micrometer range. In this case, the depth direction of the sample, i.e. the dimension along the irradiating direction of a sample beam, is captured in that—in simplified terms—the distance of scattering centers within the sample from the light source is measured by means of interferometric signals. Light with a comparatively long wavelength, typically in the near-infrared range, is used in OCT. This has the advantage that the light can penetrate comparatively deep into the scattering medium such that its scans sections can be recorded with near microscopic resolution. OCT has been successfully used, in particular, in the imaging of the human eye, in which high resolution images of the retina and the front eye section can be recorded. Another very attractive application of OCT, which is currently the object of intensive development activities, concerns intravascular imaging in the field of cardiology.

As in all interferometric methods, OCT too makes it possible to measure the interference signal in the time domain or in the frequency domain. The first process is referred to as TD(Time Domain)-OCT and the second process is referred to as FD(Frequency Domain)-OCT.

A particularly efficient variant of FD-OCT is so-called "swept-source OCT" that is explained with reference to FIG. 1. FIG. 1 shows a swept-source OCT system 10 with a tunable light source 12, namely the so-called "swept-source" 12. The tunable light source 12 carries out wavelength sweeps with a certain repetition rate $f_{sweep}$, wherein the tunable light source generates in these wavelength sweeps optical signals, in the time history of which the wavelength of the signal changes. Signals of this type are also referred to as "chirps." The signal is coupled into an interferometer 14 that has a first arm 16 and a second arm 18. In the first arm 16, the optical signal is delivered to a sample 22 via a circulator 20. The optical signal penetrates into the sample 22 up to a certain depth and is scattered in the sample 22 such that a portion of the light is reflected back into the first interferometer arm 16. Depending on the local composition of the sample 22, the optical signal is respectively scattered or reflected to a greater or lesser degree. In this way, layers underneath the surface of the sample 22, on which the optical signal is respectively scattered or reflected comparatively strong, can be rendered "visible."

The second arm 18 of the interferometer 14 is a reference arm that contains a delay loop 24. The optical signals in the two interferometer arms 16 and 18 are superimposed, for example, with the aid of a 50/50 coupler 25 and an interference signal 34, which is also referred to as a "fringe signal" 34 in the pertinent field, is generated, for example, with the aid of photodetectors 26 and a differential amplifier 28.

The interference signal 34 therefore consists of the superposition of two optical signals with time-variant wavelengths (chirps). In this case, the two superimposed signals are shifted in time to a degree that is dependent on the transit time differential along the first and the second arm 16, 18. This transit time differential in turn depends on the depth, at which the light is scattered within the sample 22. In an exemplary embodiment, the optical wavelength differential and therefore the time shift of the signals relative to one another decreases as the depth of the scattering center increases. Since the wavelength of the signals is time-variant due to the wavelength sweep, the wavelengths increasingly deviate from one another in the superposition as the time shift increases such that a beat is generated in the interference signal, wherein the frequency of this beat rises as the time shift increases. In simple terms, the respective scattering or reflection on a low-lying scattering center of the sample 22 results in a high-frequency interference signal 34 in this case and the scattering on the surface of the sample 22 results in an interference signal 34 with low beat frequency. Depending on the mutual adaptation of the lengths of the interferometer arms 16, 18, however, a small transit time differential (and therefore the low beat frequency) can also be obtained for a low layer rather than for the surface. Regardless of the special configuration, depth scans of the sample 22 can in this way be generally recorded in the form of frequency information.

FIG. 2 shows the schematic design of a conventional OCT system, in which the interferometer 14 is designed similar to FIG. 1, but not illustrated in detail. The OCT system 10 according to FIG. 2 likewise contains a tunable light source 12 that receives a sweep control signal 30 generated by an oscillator 32. The sweep control signal 30 defines the repetition rate $f_{sweep}$, with which the light source 12 is tuned. For this purpose, the sweep control signal 30 itself may have the frequency $f_{sweep}$ or a multiple thereof.

It should be noted that the oscillator 32 may form part of the light source unit 31 that is schematically illustrated in the form of a box drawn with broken lines in FIG. 2. For example, the oscillator 32 may form part of the control electronics of the light source unit 31. The sweep control signal 30 may consist of any suitable signal, the frequency of which influences the repetition rate $f_{sweep}$ of the light source 12. The concrete configuration of the sweep control signal 30 depends on the respective design of the tunable light source 12 in this case. FIG. 2 furthermore shows that a feedback 32 between the tunable light source 12 and the oscillator 32 may be provided in order to adapt the frequency of the oscillator 32 to the operation of the tunable light source 12. This is important, for example, if the light source 12 used consists of an FDML laser, in which the sweep rate needs to be precisely adapted to the cycle time of the light that may vary, for example, due to temperature fluctuations.

The interference signal 34 from the interferometer 14 is sampled with an AD converter 36 that represents a detection device for the time-resolved detection of the interference signal 34. In the context of the present invention, the interference signal 34 is detected "with the aid of" the detection clock signal 38. In other words, the detection clock signal 38 is used in the operation of the detection device 36 and influences or directly or indirectly defines the time response of the detection device 36. It may particularly define the points in time or the cycle, in which the interference signal 34 is detected or sampled. In the concrete exemplary embodiment, the AD converter 36 has an input for a detection clock signal 38 that is generated by an additional oscillator 40. The AD converter 36 converts the interference signal 34 into digital data 42 at points in time that are defined by the detection clock signal 38. In the illustration in FIG. 2, the AD converter 36 and the additional oscillator 40 form part of a data acquisition unit 41 that is illustrated in the form of a box drawn with broken lines. The nominal frequencies of the oscillators 32 and 40 have a certain, not necessarily integral relation to one another such that the time history of the frequency sweep and of the detection can be computationally correlated, but the oscillators 32 and 40 in principle operate independently of one another. In the context of the present disclosure, the term "oscillator" should be interpreted in a broad sense and is not e.g. limited to any special type of oscillator such as, for example, a quartz oscillator. The oscillator may also consist, for example, of a DDS, an analog oscillator that is controlled to a resonance of the tunable light source, etc.

Each wavelength sweep of the light source 12 corresponds to a depth scan of the OCT system 10. At the beginning of each wavelength sweep, a trigger signal (not illustrated in FIG. 2) is transmitted to the AD converter 36 in order to assign the digital data 42 to the associated wavelength sweep.

The detection clock signal 38 has a frequency $f_{samp}$ that defines the sampling rate, with which the interference signal 34 is sampled by the AD converter 36. In this case, the sampling rate $f_{samp}$ typically amounts to at least 2.5-times the highest frequency of the interference signal 34 to be detected. According to the Nyquist criterion, the double sampling rate would suffice, but the response at the upper end of the frequency band decreases in this case, wherein this decreased response is in practical applications prevented with increased oversampling by factors between 2.5 and 5. In practical applications, $f_{samp} \gg f_{scan}$, typically by a factor between 500 and 2000.

In the OCT system according to FIG. 2, the interference signal 34 is therefore sampled in constant time intervals that are defined by the reciprocal value of $f_{samp}$. In the image generation that is based on a Fourier transformation, however, it is required that the sampling points are equidistant in the optical frequency. In sampling that is equidistant in time, this is only the case if the optical frequency change of the tunable light source 12 is linear in time during the wavelength sweep, but this can hardly be achieved in practical applications. This is the reason why the digital data 42 usually is reprocessed or "resampled." In a resampling process, the interference signal 34 is determined at certain supporting points in time by interpolating the measured digital data 42, wherein the supporting points are chosen such that the sampling points are equidistant in the optical frequency of the interference signal 34.

Alternatively, the detection clock signal 38 may also be generated in the form of a time-variable clock signal realized in such a way that the samples are already generated linearly in the optical frequency differential. Such a clock signal is known as the "k-clock" of OCT systems, wherein the "k" stands for the wave number. In this case, the k-clock signal typically is a pulse train with variable intervals in the time domain, but identical intervals in the optical frequency domain. An OCT system with such a k-clock is schematically illustrated in FIG. 3. The k-clock is generated directly from the light of the tunable light source 12 by an additional interferometer 44 with constant arm length differential. The k-clock may be defined, for example, by the zero crossings of the interference signal in the interferometer 44. In this way, a non-linear progression of the wavelength sweep of the light source 12 is automatically compensated.

It is generally attempted to increase the speed of the depth scans. Since a depth scan corresponds to one wavelength sweep in swept-source OCT, this means that the frequency $f_{sweep}$ needs to be increased. For this purpose, the present inventors have proposed a tunable Fabry-Perot filter that allows sweep frequencies of several hundred kHz up into the MHz range. When using such a Fabry-Perot filter, the wavelength is typically modulated approximately sinusoidally, but the portion in which the wavelength changes at least approximately linearly with time is preferably used for the wavelength sweep. In order to avoid delay times, the prior art already utilizes so-called buffered tunable light sources, in which only a largely linear section of the entire wavelength sweep is used and then optically split into a plurality (e.g. 2, 4 or 8) of wavelength sweeps that are mutually delayed in time and reassembled. In this way, a continuous sweep signal is generated, in which the wavelength changes with time in a ramp-like or sawtooth-like fashion. The sweep rate can also be effectively increased with the number of buffered wavelength sweeps.

However, the inventors have discovered that problems with the quality of OCT images can arise as the sweep rate increases. This is the case, in particular, if each depth scan is not triggered individually as described with reference to FIG. 2, but a complete data frame, which is composed of the detection data of a plurality of wavelength sweeps, rather is generated in the form of a continuous data stream with a single trigger. In this case, a data frame may comprise a complete line of depth scans such as, for example, around 1000 depth scans that jointly form a two-dimensional image. This option can be used with higher sweep rates $f_{sweep}$ and buffered light sources, i.e. those without delay times between sweeps, because problems caused by trigger delay times, which occur if each depth scan would be triggered individually, can be avoided. Such trigger delay times occur in typical data acquisition cards between the last sample of a just triggered acquisition and the focusing on the next trigger.

The following concrete problems with the image quality arise in practical applications and are explained below with reference to FIGS. 4 and 5.

FIG. 4 shows a 2D frame consisting of 1600 depth scans on the nail bed of a human fingernail. The entire frame was recorded with one continuous data stream, i.e. in response to a single "common" trigger that is also referred to as "frame trigger" in the present disclosure. FIG. 4 shows that a certain blur develops in the image from the left side toward the right side.

FIG. 5 likewise shows a 2D frame that was recorded with a single frame trigger. In this case, FIG. 5 shows a 2D depth scan of the skin of a human finger. Although the image quality is adequate with respect to the actually interesting structures, interfering horizontal lines occur in the image.

Although the above-described tomographic method for producing depth scans in a sample is the most commonly used type of OCT, the basic principle of OCT can also be used for other purposes. One such example is a photoacoustic detection system of the type described in the article "*Intrasweep Phase-Sensitive Optical Coherence Tomography For Noncontact Optical Photoacoustic Imaging*" (Cedric Blatter, Branislav Grajciar, Pu Zou, Wolgang Wieser, Aart-Jan Verhoef, Robert Huber and Reiner A. Leitgeb; Optics Letters, Vol. 37, 21st Edition, pp. 4368-4370 (2012)), wherein this article is hereby incorporated into the present disclosure by reference. In simplified terms, a shockwave is triggered in a sample such as, for example, in a tissue with a light pulse in such a photoacoustic detection. Similar to ultrasound methods, this shockwave could then be detected with corresponding "microphones." However, it is also possible to use OCT for the detection of the shockwave, namely by detecting the motion of the sample surface—i.e. the result of the shockwave in the issue—with the aid of OCT. The detection set-up is similar to conventional OCT systems for depth scans, but the recorded data is evaluated differently because the motion of the surface is so fast that several oscillations occur per frequency sweep. In contrast to the conventional version of OCT, only the surface, particularly the motion of the surface, is detected in this case, but no depth information.

SUMMARY OF THE INVENTION

The invention is based on the objective of disclosing a swept-source OCT system and a swept-source OCT method that allow the use of high wavelength sweep rates and still produce images with sound image quality.

This objective is attained with a swept-source OCT system according to claim 1 and a swept-source OCT method according to claim 20. Advantageous enhancements are disclosed in the dependent claims.

The inventors have discovered that blurriness problems of the type illustrated in FIG. 4 or problems with interfering artifacts of the type illustrated in FIG. 5 surprisingly can be substantially reduced in that the sweep control signal and the detection clock signal are phase-locked.

The inventors have furthermore discovered that very slight variations in the ratio between $f_{scan}$ and $f_{samp}$ already lead to surprisingly severe blurriness problems of the type illustrated in FIG. 4. This is the case, in particular, if a complete 2D frame is recorded with a single frame trigger—as in the OCT image in FIG. 4. In a frame of the type illustrated in FIG. 4 with 1600 depth scans and, for example, 1000 samples per depth scan, a change of $f_{samp}$ relative to $f_{sweep}$ by only 1 ppm would already cause the first sample of the last depth scan of the frame to be misaligned by 1.6 samples. This causes the phase position to shift during resampling such that the 2D image in FIG. 4 becomes increasingly blurry along the scanning direction. However, such slight fluctuations in the ratio between $f_{sweep}$ and $f_{samp}$ are difficult to avoid and it is at first sight surprising that they have such a significant effect on the image quality.

In addition to blurriness, artifacts may also occur as illustrated in FIG. 5. These artifacts are apparently caused in that a shift between the recorded background and the actually measured data occurs without fixed phase relation between the sweep control signal and the detection clock signal such that a spectrally sharp-edged background (e.g. water absorption lines in the interferometer) is no longer correctly subtracted and interfering (in practical applications usually "flickering") strips are created in the image as illustrated in FIG. 5. As demonstrated below, these problems can also be solved with the fixed phase relation between the sweep control signal and the detection clock signal. It should be noted that the term "phase-locked" means in the context of the present disclosure that a fixed phase relation is indeed required, but not necessarily that the respective signals have an integer frequency ratio.

It should be noted that a fixed phase relation between the sweep control signal and the detection clock signal, i.e. between two electrical signals, is realized in accordance with the present invention. The obvious way for realizing a fixed phase relation between the wavelength sweep and the data sampling would consist of deriving the detection clock signal from the optical signal as it is already the case with the k-clock in FIG. 3. Although data sampling with k-clock of the type illustrated in FIG. 3 is primarily used in order to avoid resampling, the wavelength sweep and the sampling of the interference signal also are already intrinsically phase-locked in this case.

However, the inventors intentionally avoided a solution that utilizes an optically generated k-clock, but rather gave preference to phase-locking the electrical signals. The reason for this can once again be seen in the desire to operate with the fastest wavelength scan possible. According to the Nyquist theorem, the k-clock frequency always needs to be greater than the highest HF-frequency in the interference signal. However, the phase jitter in the interference signal increases due to the limited coherence length of the tunable light source that decreases as the sweep rate $f_{sweep}$ increases. This problem can be diminished, but not eliminated, by means of band-pass filtering of the k-clock signal. The phase jitter on the clock signal directly translates into a phase jitter in the recorded samples. This leads to a deterioration of the signal-to-noise ratio and to a blurry image.

The decreasing coherence at higher sweep rates $f_{sweep}$ basically makes an OCT scan at greater depths more difficult. Nevertheless, it was determined that OCT (however, without k-clock) by all means makes it possible to still image at depths, at which the interference capability has decreased by more than 10 dB, i.e. far beyond the coherence length. Consequently, the reduced coherence length resulting from a higher sweep rate $f_{sweep}$ is often less restrictive for OCT depth scans than one might assume at first sight. When a k-clock is used, however, one encounters the above-described additional problem that the phase jitter in the interference signal increases as the coherence decreases, wherein this increasing phase jitter in turn makes the sampling of high frequencies in the interference signal less accurate. As initially mentioned, however, especially the high frequencies in the interference signal are representative for greater depths. According to the invention, in which the fixed phase relation is realized between the electrical signals and not by means of a k-clock, it is possible to scan greater depths than in instances, in which a k-clock is used, with higher sweep rates $f_{sweep}$.

In the above-described embodiment of the invention, the sweep control signal and the detection clock signal are phase-locked in the physical sense. However, it is also possible to achieve a similar effect with respect to the improvement of the image quality if the signals themselves are not phase-locked in the strict sense of the word, but their frequency ratio and their relative phase position are precisely known. In this case, it is possible to precisely correlate the detected data to the wavelength sweep by incorporating this information. In simplified terms, phase-locking can be realized in this way by subsequently processing the data, which is usually referred to as "resampling," wherein the phase-locking is not realized in hardware, but rather in software, namely the data processing software. According to another embodiment of the invention, means for generating a signal or a signal sequence that is respectively characteristic for the frequency ratio and/or the relative phase position of the sweep control signal and the detection clock signal are provided for this purpose.

These means may particularly comprise:
  means for generating a reference signal, particularly a pulse signal, that is phase-locked with the sweep control signal or a sequence of such reference signals, and
  means for coupling the reference signal or the sequence of reference signals into the input of the detection device.

Since the phase-locked reference signal is detected with the detection device, i.e. with the aid of the detection clock signal, the resulting signal is characteristic for the relative phase position between the detection clock signal and the reference signal and therefore the sweep control signal.

It is furthermore preferred to provide means for determining the frequency ratio and/or the relative phase position between the sweep control signal and the detection clock signal from the reference signal or the reference signal sequence detected with the aid of the detection clock signal.

The detection device is preferably suitable for sampling the interference signal with the cycle of the detection clock signal. In this case, the detection device preferably comprises an AD converter that is suitable for receiving the detection clock signal and for converting the interference signal into digital data at points in time defined by the detection clock signal.

The repetition rate $f_{sweep}$ of the tunable light source amounts preferably to at least 50 kHz, particularly at least 350 kHz, especially at least 1.4 MHz.

The tunable light source preferably is a buffered light source, by means of which successive wavelength sweeps can be carried out essentially without time gap, and the swept-source OCT system is designed for generating a data frame consisting of the detection data of a plurality of wavelength sweeps or a data volume consisting of a plurality of data frames in the form of one continuous data stream. In this context, the term "essentially" without time gap includes instances, in which there is no time gap at all, but also instances with only slight time gaps, particularly time gaps that amount to less than 10% of the overall operating time. In this case, the data acquisition therefore is not triggered for each individual depth scan that is also referred to as an "A-scan," but a single trigger is used for several depth scans, the entire data frame or even an entire data volume. A "data frame" refers to a two-dimensional depth scan in this case. A data volume may be composed of a plurality of frames, for example a plurality of adjacent two-dimensional depth scans. However, the data volume can also be generated, for example, with the aid of a spiral scan of the type suitable for use, for example, in intravascular OCT. Such a spiral scan also generates a data "volume" because it ultimately delivers three-dimensional information on the sample. If the data frame (or data volume) is generated in the form of one continuous data stream, i.e. without a separate trigger for each A-scan, a delay time between the last sample of a just triggered acquisition and the focusing on the next trigger can be respectively prevented within the frame or within the volume as mentioned above. Nevertheless, this frame-by-frame or volume-by-volume sampling with only one respective trigger is associated with other difficulties if the repetition rate $f_{sweep}$ of the wavelength sweep and the sampling rate $f_{samp}$ fluctuate or drift relative to one another. However, precisely this problem is solved with the present invention by phase-locking the sweep control signal and the detection clock signal.

Furthermore, the system preferably comprises a scanning device, by means of which the sample beam can be scanned over a sample, wherein the scanning device is activated by a scanning signal that is phase-locked with the sweep control signal. Such scanning devices may comprise, for example, deflection mirrors that are operated with galvanomanometric motors or so-called "galvos." Other examples are spiral scan catheters suitable for intravascular OCT or polygon scanners. Resonant scanners frequently allow high scanning speeds, but often have only a relatively narrow resonance range that needs to be taken into consideration in the phase-locking. This can lead to the frequency of the sweep control signal and of the scanning signal not necessarily being integrally related, but this is not absolutely imperative for the purpose of phase-locking. In fast OCT systems, the imaging beam is frequently moved over the sample so fast that the beam advances by about one beam diameter per depth scan. If the scanner is not phase-locked, the start of the scanning phases therefore can only be determined with an accuracy of ±1 sweep of the tunable light source such that the position of the first depth scan is not exactly defined in the scanning direction, but rather subject to some uncertainty. In a 3D scan, this can lead to "zipper artifacts," particularly if the image contains structures that lie perpendicular to the fast scanning direction. The OCT data sets furthermore can thusly be reproduced in a superior fashion. This is particularly advantageous with respect to averaging methods such as, for example, the so-called "volume averaging" in order to prevent "smearing" of the averaged image.

In an advantageous enhancement, the swept-source OCT system comprises a synchronization unit that is designed for generating a data frame start signal or a data volume start signal that is synchronized with the scanning device or with the scanning signal and phase-locked with the sweep control signal. For example, this synchronization unit may generate the data frame start signal or the data volume start signal at a point in time, at which the scanning device is in the correct location. Additional trigger jitter can be prevented because this signal is furthermore phase-locked with the sweep control signal. If a buffered tunable light source is used, it is advantageous to synchronize the frame start or volume start with a special sweep such as, e.g., the primary sweep, the first buffered sweep, etc., such that the resampling and the subtraction of the background are simplified.

In an advantageous embodiment, the swept-source OCT system furthermore comprises a device for closed loop control or readjustment of the sweep control signal during the operation of the system in such a way that the coherence characteristic of the light source are stabilized with respect to environmental influences. This is particularly useful if the tunable light source used consists of a Fourier Domain Mode Locking (FDML) laser, for example, of the type described in R. Huber, M. Wojtkowski and J. G. Fujimoto, "*Fourier Domain Mode Locking (FDML): A New Laser Operating Regime And Applications For Optical Coherence Tomography,*" Optics Express, 2006, 14 (8); pp. 3225-3237. An FDML laser typically comprises an optical semiconductor amplifier as light source in a resonator, a Fabry-Perot filter that serves as an optical band-pass filter and a delay loop that is dimensioned such that the cycle time of the light out of the resonator, through the delay loop and back into the resonator amounts to an integer multiple of the sweep period of the filter. A portion of the laser light is then respectively decoupled by means of a phase coupler. The delay loop consists of a glass fiber coil of corresponding length. However, the optical path length and therefore the delay time may vary due to environmental influences such as, for example, temperature fluctuations such that the cycle time and the time for the wavelength sweep no longer exactly correspond to one another and a reduced coherence may result. In this case, it is advantageous to provide the aforementioned device for adjusting the sweep control signal, wherein this device readjusts the sweep control signal and therefore the sweep frequency accordingly in order to keep the coherence stable by means of closed loop control. Since the detection clock signal is in accordance with the invention phase-locked with the sweep control signal, this can be realized without further modification of the detection device.

The fixed phase relation between the sweep control signal and the detection clock signal is preferably realized by providing means for deriving one of the signals from the other signal or for deriving both signals from a common source signal.

For this purpose, it is preferred to provide means for realizing the fixed phase relation in accordance with one of the following variations or a combination of several of the following variations:

- the detection clock signal is generated from the sweep control signal with the aid of a phase-locked loop (PLL), wherein the frequency of the detection clock signal preferably amounts to a multiple, particularly (but not necessarily) an integral multiple, of the frequency of the sweep control signal,
- the sweep control signal is generated by means of frequency division and the detection clock signal is generated by means of frequency multiplication from a signal, the frequency of which amounts to a multiple of the sweep control signal frequency, with the aid of a PLL, or
- the sweep control signal is derived from the detection clock signal by means of frequency division.

All three variations may generally be considered, but the sweep rate $f_{sweep}$ and the data acquisition rate $f_{samp}$ typically differ by a factor >1000 such that it is technically challenging to derive the significantly faster data clock signal from the sweep control signal with the aid of a PLL. Instead, it is particularly preferred to use the second variation, in which the sweep control signal and the detection clock signal are derived from a common signal, the frequency of which lies between $f_{sweep}$ and $f_{samp}$.

In a further embodiment, the swept-source OCT system comprises a k-clock generator for electronically, in particular digitally generating a k-clock based on an input signal that is phase-locked with the sweep control signal. In this case, the electronically or "artificially" generated k-clock signal serves as detection clock signal for the detection device.

In contrast to customary methods known from the prior art, the k-clock is in this case not derived from the optical signal, but rather generated entirely "artificially," for example in a digital fashion, based on an input signal that is phase-locked with the sweep control signal. In this context, the term "artificially generated" is merely intended to express that the signal is not directly derived from the optical signal. Although the artificially or electronically generated k-clock signal consists of clock pulse edges with time-variable intervals, it is in accordance with the parlance of the present disclosure considered as being phase-locked with the sweep control signal because the input signal of the k-clock generator is phase-locked with the sweep control signal. The timing of the digitally generated k-clock preferably is once again chosen such that the sampling points defined by the k-clock signal are at least approximately equidistant in the optical frequency of the interference signal in order to eliminate the need for resampling.

In one advantageous embodiment, the k-clock generator comprises a synthesizer that is connected for receiving the input signal phase-locked with the sweep control signal and suitable for generating the k-clock signal, in particular, in a digital fashion, wherein the synthesizer preferably comprises one or more of the following components: a FPGA or an ASIC that receives the input signal phase-locked with the sweep control signal and generates the k-clock signal or a precursor signal thereof from said input signal, a DDS that receives the input signal phase-locked with the sweep control signal and is connected to an ASIC or a FPGA in order to receive frequency information for generating the k-clock therefrom, a mixer that is designed for mixing the input signal phase-locked with the sweep control signal with a signal of variable frequency in order to generate the k-clock signal or a precursor signal thereof and/or a low-pass filter in the region of the synthesizer output.

In an advantageous embodiment, the swept-source OCT system comprises a memory, in which data for a recalibration or for a resampling of the detected interference signal are stored by the manufacturer. This data may contain, in particular, points in time for supporting points, at which the interference signal needs to be determined by interpolating the interference signal measured with the aid of the detection clock signal of the detection device, wherein the points in time are chosen such that the sampling points are equidistant in the optical frequency of the interference signal. However, other data may also be used for recalibrating or resampling purposes, wherein the data is stored in the form of operation characteristics, lookup tables or the like. Due to the fixed phase relation between the sweep control signal and the detection clock signal, it may suffice if the recalibration or resampling data is determined only once and subsequently stored by the manufacturer, particularly if an FDML laser is used as tunable light source. An additional interferometer for determining this data is then no longer required for each individual device. If an FDML laser is used as tunable light source, it should be noted, for example, that the number of free spectral regions of the associated wavelength filter may change, e.g., due to temperature fluctuations. In this case, it is preferred that the recalibration or resampling data respectively comprises an associated data set for the corresponding number of free spectral regions. If applicable, a data set or and operation characteristic per buffer stage may also be required. The entirety of such data sets is in the present disclosure referred to as "recalibration or resampling data."

In contrast to the FDML laser, each sweep of MEMS-based sources such as, for example, VCSEL-sources is slightly different, at least during the operation outside the mechanical resonance of the frequency filter, such that the one-time storage of the recalibration or resampling data will not necessarily suffice. This is the reason why it is currently common practice to use an optically generated k-clock in OCT systems with a VCSEL as tunable light source. However, this is disadvantageous with respect to higher sweep rates for the above-described reasons. In instances, in which the individual wavelength sweeps are not entirely consistent and data that was only stored once therefore cannot be used for the recalibration or for the resampling, it is instead proposed to provide an additional interferometer that is designed for generating an additional interference signal during the operation of the system. Furthermore, a device for detecting the additional interference signal and for calculating the recalibration or resampling data from the detected additional interference signal is provided. Consequently, an optical k-clock is also not utilized in this embodiment, but the sampling still takes place with data that is generated in a purely digital fashion and resampling is subsequently carried out. However, the data required for the recalibration or the resampling is adapted by utilizing the detected additional interference signal. The variations between the wavelength sweeps can be derived from the detected additional interference signal and taken into consideration in the recalibration or resampling data.

BRIEF DESCRIPTION OF THE FIGURES

Other advantages and characteristics of the invention result from the following description, in which the invention is elucidated in greater detail with reference to preferred exemplary embodiments that are illustrated in the attached drawings. In these drawings.

DESCRIPTION OF PREFERRED EMBODIMENTS

Figure 6A:
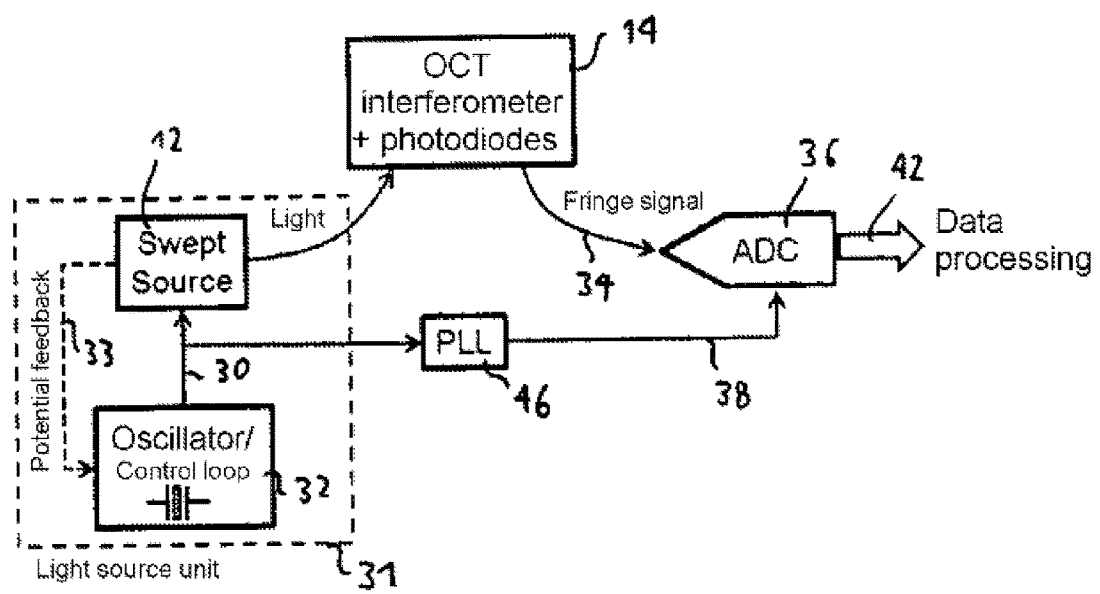
FIG. 6a shows a schematic representation of an inventive swept-source OCT system with phase-locked detection clock signal.

FIG. 6a shows the schematic design of a swept-source OCT system 10 according to the invention. The swept-source OCT system essentially consists of the same components as the system in FIG. 2, wherein these components are not described anew and identified by the same reference symbols. The essential difference can be seen in that a phase-locked loop (PLL) 46 is provided, by means of which a detection clock signal 38 is derived from the sweep control signal 30, wherein this detection clock signal has a frequency that amounts to a multiple of the frequency of the sweep control signal 30 and is phase-locked therewith. For example, the sweep control signal 30 may have a frequency of 1 MHz that corresponds to the repetition rate $f_{sweep}$ of the tunable light source 12, whereas the detection clock signal may have a frequency of 1 GHz. In this case, a phase-locked detection clock signal 38 is derived from the sweep control signal 30 with the aid of the PLL 46, wherein the frequency of this detection clock signal is higher by a factor of 1000. This means that the AD converter 36 samples the interference signal 34 of the interferometer 14 with 1000 samples per sweep.

Figure 6B:
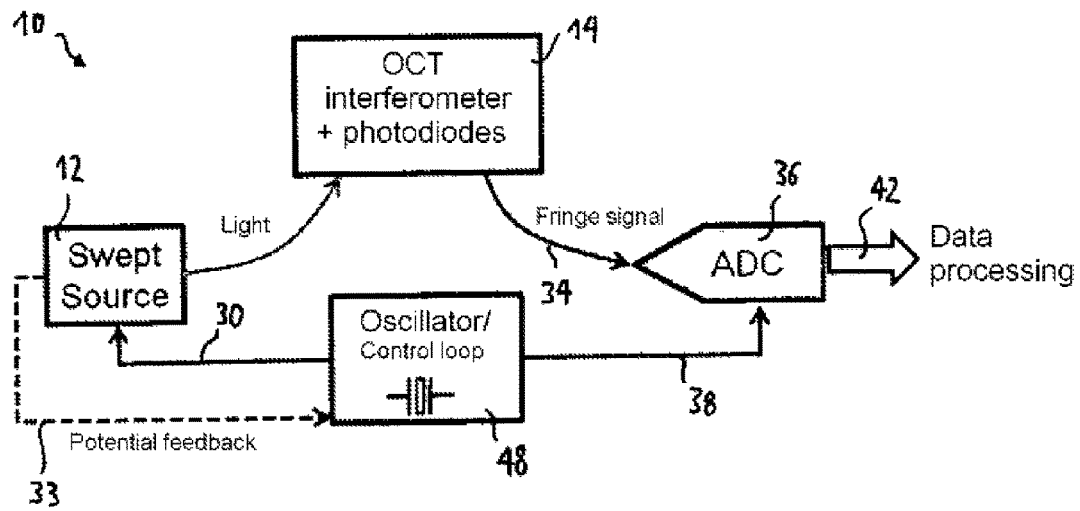
FIG. 6b shows an alternative inventive swept-source OCT system with phase-locked detection clock signal.

FIG. 6b shows an alternative embodiment, in which a reference oscillator 48 is used, the frequency $f_{ref}$ of which lies between the frequency of the sweep control signal 30, i.e. typically $f_{sweep}$, and the frequency of the detection clock signal 38, i.e. $f_{samp}$. The sweep control signal 30 can then be derived from the signal of the reference oscillator 48 by means of frequency division and the detection clock signal 38 can be derived from the signal of the reference oscillator with the aid of a PLL (that is not illustrated in FIG. 6b).

The advantage of this embodiment in comparison with that illustrated in FIG. 6a can be seen in that a single PLL does not have to accomplish a frequency multiplication by a factor on the order of 1000 or more depending on the embodiment, which is technically challenging in light of the fact that phase jitters need to be simultaneously suppressed and a sound spectral purity of the signal needs to be ensured. However, the common essential characteristic of both variations is that the sweep control signal 30 and the detection clock signal 38 are phase-locked with one another in both instances.

Figure 7:
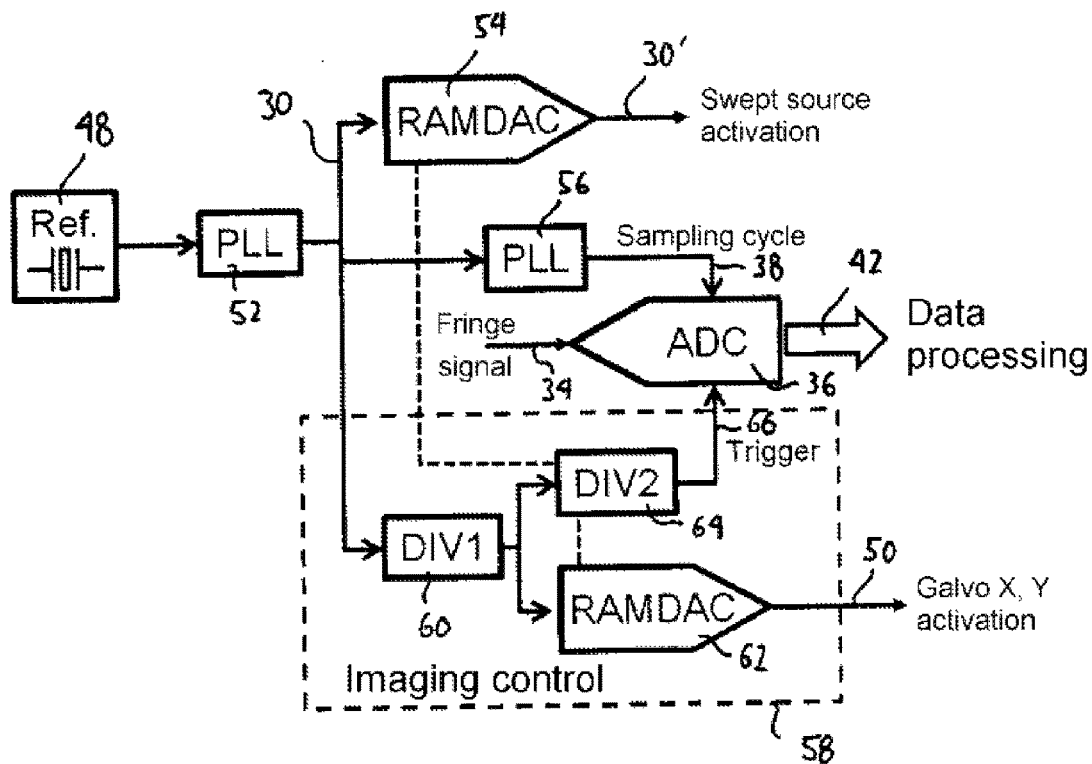
FIG. 7 shows a circuit designed for generating a sweep control signal, a detection clock signal and a scan control signal that are respectively phase-locked.

FIG. 7 shows a circuit design for generating a sweep control signal 30, a detection clock signal 38 and a scan control signal 50 that are respectively phase-locked in greater detail. In this exemplary embodiment, all three signals 30, 38 and 50 can be traced back to a single reference oscillator 48 that may consist, for example, of a 10 MHz quartz oscillator. All frequencies mentioned below should merely be interpreted in an exemplary sense and serve for illustrative purposes only. In the example illustrated in FIG. 7, the signal of the reference oscillator 48 is transformed to a higher frequency, for example, of 100 MHz with the aid of a first PLL 52. The first PLL 52 may consist, for example, of an adjustable fractional PLL such that its output frequency can be precisely adjusted and adapted, in particular, to the (not-shown) tunable light source. In the context of the present disclosure, the output signal of the first PLL 52 represents a sweep control signal 30 because it respectively defines the frequency or the repetition rate of the wavelength sweep. In the exemplary embodiment shown, the sweep control signal 30 is coupled into a RAMDAC 54. The RAMDAC 54 has a memory (RAM), in which a number n of samples is stored. These samples are successively input into a D/A converter (i.e. "DAC") contained in the RAMDAC synchronous with the cycle of the sweep control signal 30. In the exemplary embodiment illustrated in FIG. 7, for example, a sine wave is stored in the RAM of the RAMDAC 54 and a sine with a frequency that is lower than that of the sweep control signal 30 by a factor of 1/n is obtained as the signal 30' at the output. For example, the sine may have a frequency of 200 kHz, with which a tunable light source in the form of the filter of a (not-shown) FDML laser is then operated.

The sweep control signal 30 is furthermore coupled into a second PLL 56, by means of which the detection clock signal 38, i.e. the "sampling cycle," is generated, wherein the detection clock signal is therefore phase-locked with the sweep control signal 30. For example, the second PLL 56 may increase the frequency of the sweep control signal from approximately 100 MHz to approximately 1 GHz.

Finally, the arrangement illustrated in FIG. 7 also contains an imaging control 58 that is illustrated in the form of a box drawn with broken lines. The imaging control 58 contains a first frequency divider 60 that divides the frequency of the sweep control signal 30 into the same frequency as the RAMDAC 54 such that the sweep frequency is available at the output of the first divider 60. A second RAMDAC 62 is then activated with this sweep frequency and in response thereto generates the scan control signal 50, by means of which two (not-shown) galvanometric motors with deflection mirrors can be driven. Finally, the frequency of the first divider 60 is divided once again by means of a second divider 64 in order to generate a trigger signal 66 that consist of a frame trigger in the exemplary embodiment shown. The frame trigger is generated once per scanning line, wherein the "line" corresponds to the scanning direction of the faster of the two galvanometric motors. The frame trigger therefore marks the beginning of a two-dimensional depth scan.

The inventors have installed a swept-source OCT system according to FIG. 6b and FIG. 7 and surprisingly determined that the initially mentioned flaws in the image quality can be corrected in an amazingly successful fashion by phase-locking these two electrical signals. This is elucidated in greater detail below with reference to FIGS. 8 to 10.

Figure 2:
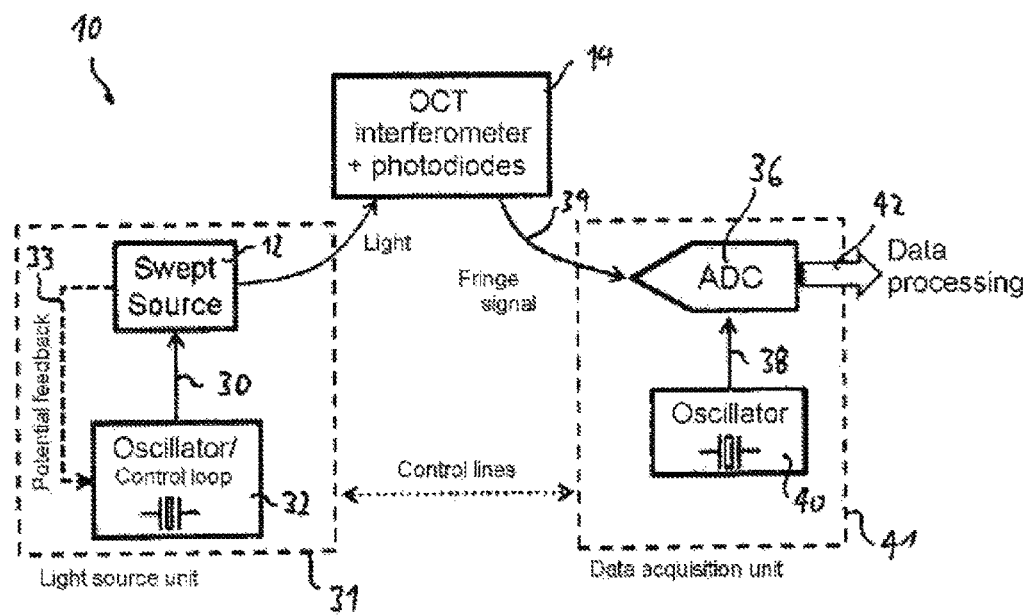
FIG. 2 shows a schematic block diagram of a conventional swept-source OCT system, in which independent oscillators are used for generating a sweep control signal and a detection clock signal.
Figure 3:
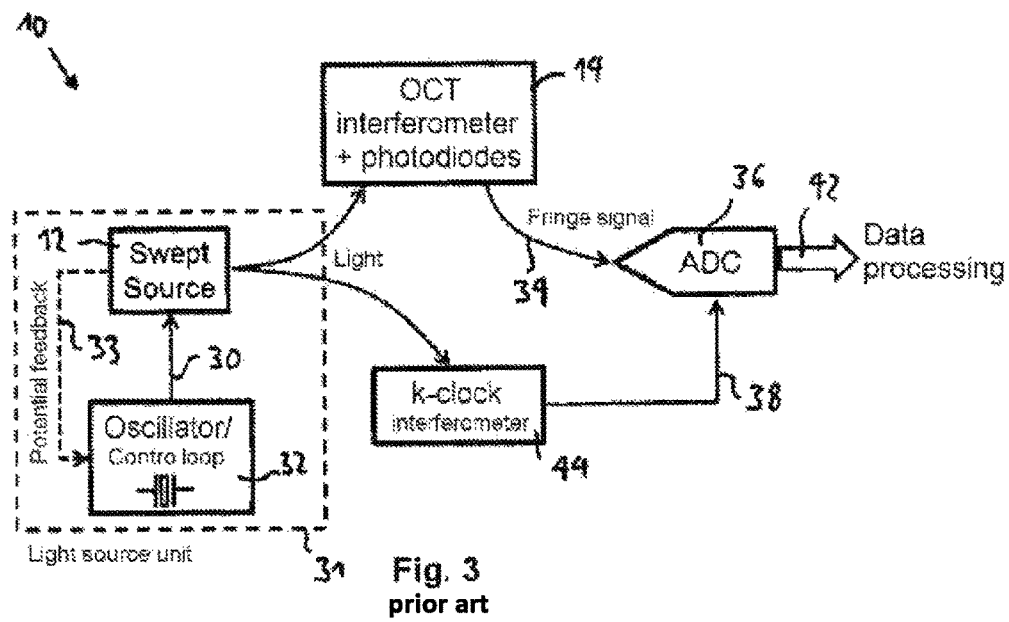
FIG. 3 shows a schematic representation of a conventional swept-source OCT system, in which the detection clock signal is formed by an optically generated k-clock.
Figure 5:
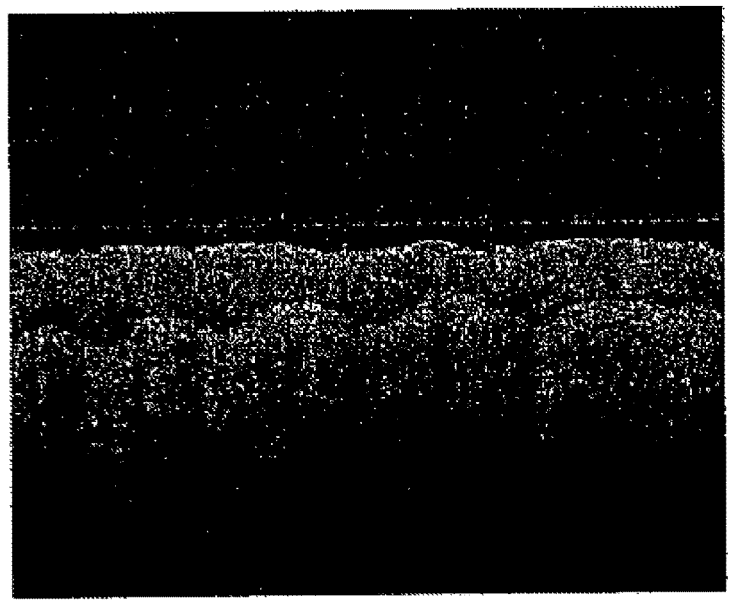
FIG. 5 shows a 2D depth scan through the skin of a human finger that was recorded with frame trigger and without phase-locked detection clock signal.
Figure 8:
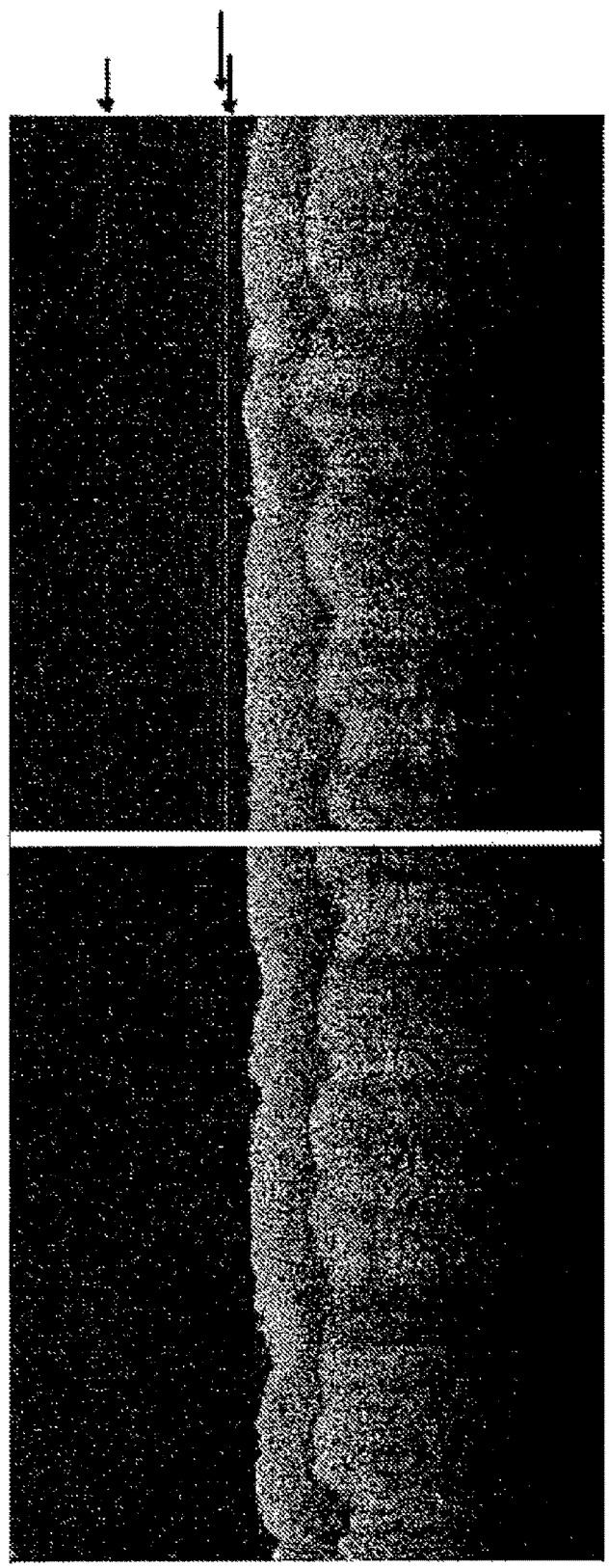
FIG. 8 shows the OCT scan of FIG. 5 in the right half of the figure and the corresponding scan when using the phase-locked detection clock signal in the left half of the figure.

The right half of FIG. 8 shows the same OCT image of a human finger (skin) as FIG. 5. The image was recorded with a single frame trigger. This means that the entire two-dimensional frame was recorded in the form of one continuous data stream over 1600 wavelength sweeps without another trigger occurring in between. As initially mentioned, each wavelength sweep corresponds to a depth scan or a pixel column in FIG. 8, which is also referred to as an "A-scan" in the pertinent field. The entire 2D frame therefore consists of 1600 depth scans. During the recording of the right OCT image in FIG. 8, the sweep control signal 30 and the detection clock signal 38 were generated by different oscillators as illustrated in FIG. 2. Nevertheless, horizontal lines that are identified by arrows and consist of artifacts that deteriorate the image quality are visible in the right image of FIG. 8 as mentioned above.

For the purpose of comparison, the left image in FIG. 8 shows a corresponding OCT image that merely differs from the right image in that the sweep control signal 30 and the detection clock signal 38 are phase-locked. The left image in FIG. 8 shows that the bright horizontal lines completely disappear.

Figure 9:
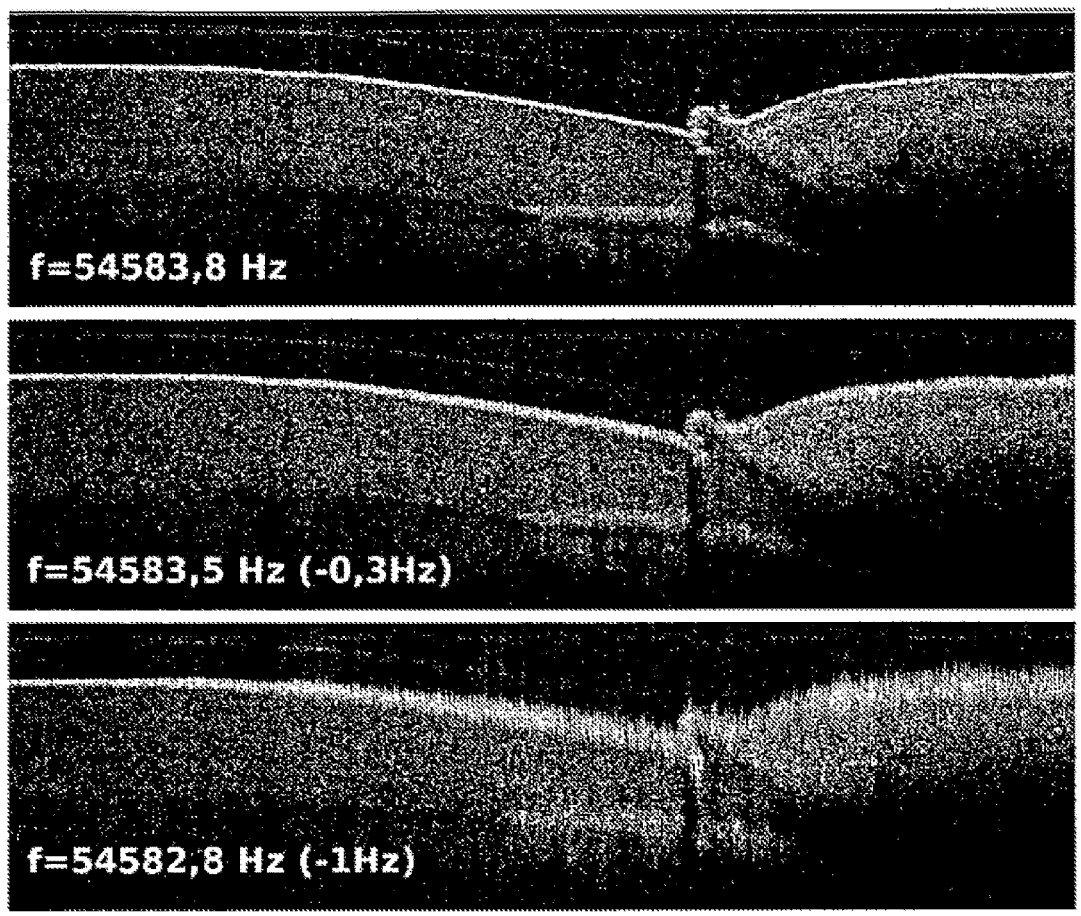
FIG. 9 shows the OCT image of FIG. 4, in which $f_{samp}$ deviates from the nominal value by 1 Hz, in the bottom region of the figure, a corresponding image, in which $f_{samp}$ deviates from the nominal value by 0.3 Hz, in the center of the figure and a corresponding image with phase-locked detection clock signal in the upper region of the figure.

FIG. 9 shows similar 2D OCT frames of a human fingernail in the region of the nail bed. The top image was recorded with the OCT system according to the invention, in which the sweep control signal 30 and the detection clock signal 38 are phase-locked. The basic sweep frequency of the tunable light source 12 amounted to 54583.8 Hz in this case. The image quality is very good.

Figure 4:
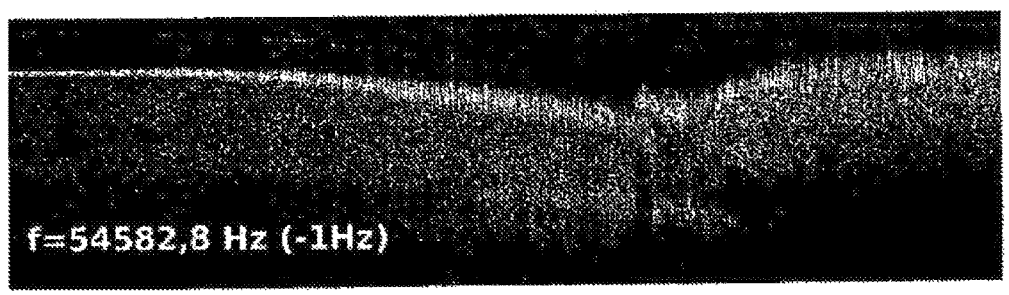
FIG. 4 shows a 2D depth scan of a fingernail that was recorded with frame trigger and without phase-locked detection clock signal.

The center image in FIG. 9 shows a corresponding recording without phase-locked detection clock signal. This figure shows that a slight variation of the sweep rate relative to the frequency of the detection clock signal already leads to a distinct deterioration of the image quality. In the center image, the basic sweep frequency of the tunable light source 12 only deviates from the ideal value by −0.3 Hz, i.e. on the order of a few ppm. Nevertheless, this already causes a certain blurriness in the image. At a deviation of 1 Hz (bottom image in FIG. 9 corresponding to FIG. 4), the blurriness of the image is already much more severe. This demonstrates that very slight fluctuations in the ratio between the sweep rate $f_{sweep}$ and the sampling rate $f_{samp}$ on the order of a few ppm can already lead to quite significant flaws in the image. However, this problem can be successfully solved by utilizing the phase-locked detection clock signal 38 as illustrated in the top image in FIG. 9.

Figure 10:
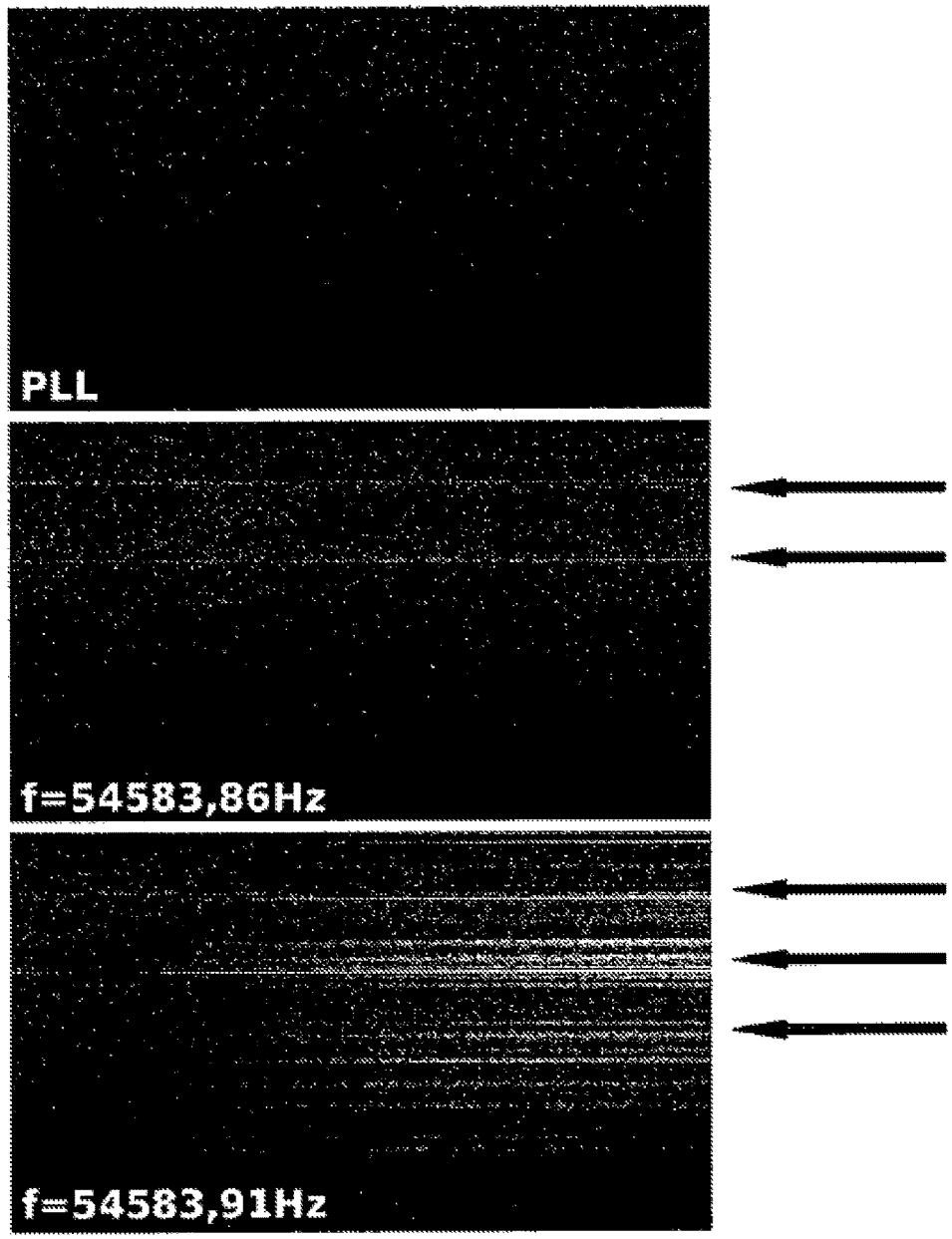
FIG. 10 shows three OCT images without sample, namely with phase-locked detection clock signal in the upper region of the figure, without phase-locking, but with optimally adjusted frequency of the detection clock signal, in the center of the figure and without phase-locking and with a frequency drift of 0.05 Hz in the detection clock signal in the lower region of the figure.

FIG. 10 finally shows three OCT images without sample that respectively were also generated in the form of one continuous data stream based on a single frame trigger. The background, particularly the water absorption lines, were subtracted in all images in a conventional manner. This should result in a largely homogenous black background.

The top image in FIG. 10 was once again recorded with a phase-locked detection clock signal 38 and in fact shows a homogenous black background.

The center image was recorded without phase-locked detection clock signal 38, but with an optimal adjustment of the frequency ratio between the sweep control signal 30 and the detection clock signal 38. Nevertheless, the center image shows bright lines that flicker in practical applications and are identified with arrows in FIG. 10. These lines can be traced back to a background that was not completely subtracted.

The bottom image in FIG. 10 once again shows an OCT image without sample, but the sweep frequency of the tunable light source 12 has drifted by a comparatively small value of 0.05 Hz in this case. Despite this slight drift, the image contains distinct flaws that can likewise be traced back to a background that was not completely removed. These image flaws are apparently caused by the individual depth scans no longer being separated in the correct sample positions after the frame trigger.

It therefore becomes apparent that relatively small deviations in the ratio between the sweep frequency and the sampling frequency can already lead to quite significant image flaws. This is the case, in particular, if each A-scan is not triggered individually, but a single trigger is rather used for an entire frame as in the described example. This problem becomes even more severe if one individual trigger is used for an entire volume, i.e. a plurality of frames. It furthermore becomes apparent that these problems can be solved in a surprisingly simple and successful fashion by utilizing a detection clock signal 38 that is phase-locked with the sweep rate.

It should be noted that the fixed phase relation between the sampling and the wavelength sweep is in this case realized entirely on the basis of the electronic signals, and that the detection clock signal 38 is not derived in the more obvious fashion from an optical interference signal (as it is the case with the conventional k-clock). The reason for this can be seen in that, as initially mentioned, the coherence length of the optical signal typically decreases as the sweep rate $f_{sweep}$ increases, wherein this once again leads to phase jitter on the optically generated k-clock signal. This source of flaws is precluded in the present invention.

Figure 11A:
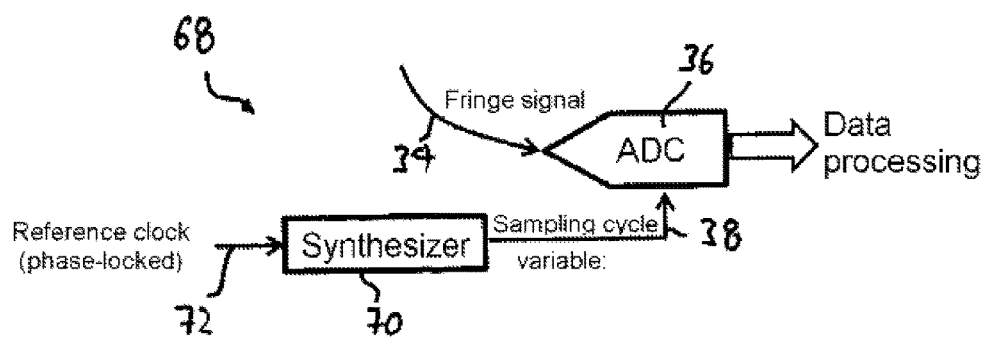
FIGS. 11a-e show schematic representations of a device for digitally generating a k-clock.

The utilization of a k-clock would at first glance also be an attractive choice because resampling would be unnecessary. However, a similar functionality can also be realized in accordance with the invention by artificially generating a k-clock. The basic principle of a k-clock generator 68 is illustrated in FIG. 11a. The device 68 comprises a synthesizer 70 for receiving a fast input signal 72 that is also referred to as "reference clock" and phase-locked with the sweep control signal 30 (not illustrated in FIG. 11a). From this phase-locked signal, the synthesizer 70 generates the artificial electronic k-clock that is then coupled into the A/D converter 36 as detection clock signal 38. The thusly generated detection clock signal 38 has a timing of the type generally known from an optically generated k-clock, but is in contrast not directly derived from the optical signal, but rather generated artificially with the aid of the synthesizer 70. The edges of the detection clock signal 38 are then no longer distributed constant in time, but rather indicate the points in time, at which the interference signal 34 needs to be sampled such that the sampling points are at least approximately equidistant in the optical frequency of the interference signal.

Figure 11B:
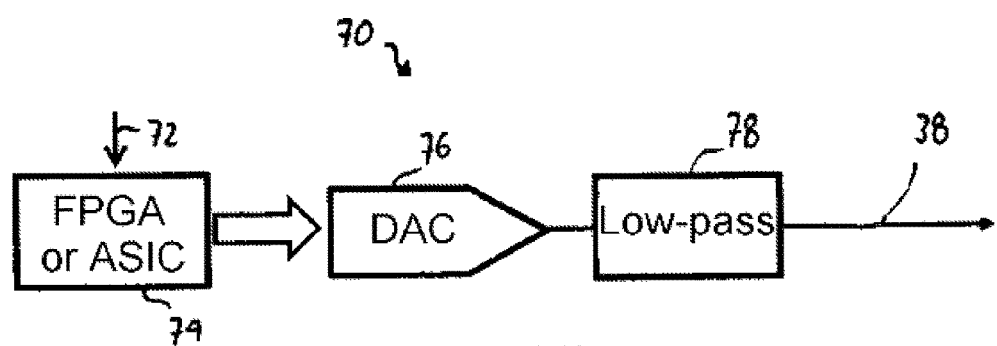

FIG. 11b shows an embodiment, in which the phase-locked reference signal 72 that typically has a comparatively high frequency, for example, of 2 GHz is input into a FPGA or ASIC 74, in which a suitable digital signal is generated by utilizing frequency adjustment information, wherein said digital signal is transferred to a D/A converter 76 in order to generate an analog signal. The analog signal is sent through a low-pass filter 78 for anti-aliasing purposes.

Figure 11C:
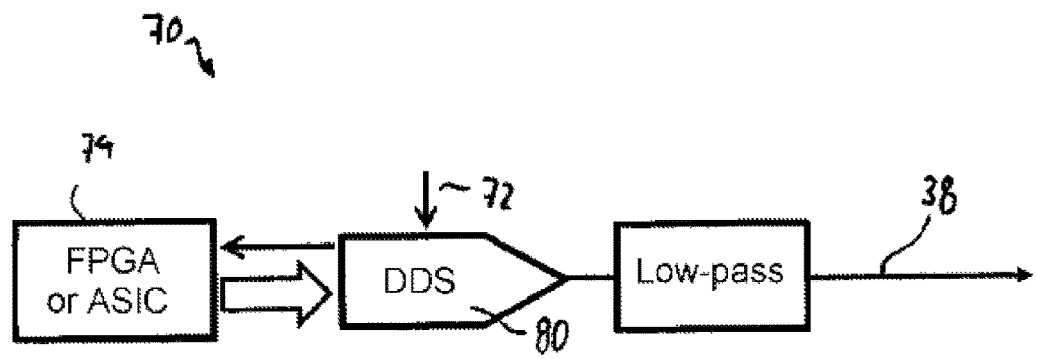

FIG. 11c shows a similar version of a synthesizer 70, in which the fast phase-locked signal 72 is not directly input into a FPGA or ASIC 74, but rather into a DDS (Direct Digital Synthesizer) 80. A FPGA or ASIC 74 is merely provided for transferring the frequency adjustment to the DDS 80 such that the respective quantity or rate of transmitted data is reduced. The arrow from the DDS 80 to the FPGA/ASIC 74 represents a signal, by means of which the DDS 80 requests the frequency adjustments from the FPGA/ASIC 74.

Figure 11D:
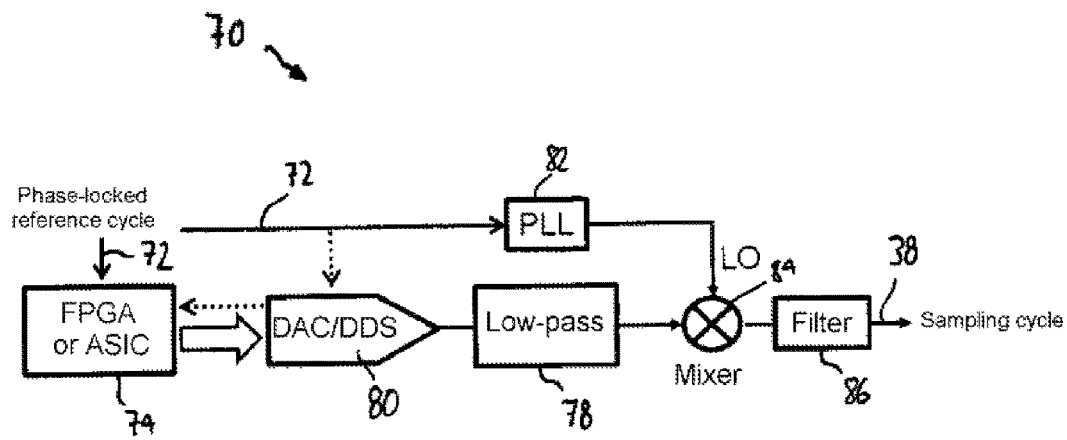

In FIG. 11d, a DDS 80 is once again used (also in combination with a FPGA or ASIC 74) in order to generate a variable clock signal. Furthermore, the time-invariant and phase-locked reference signal 72 is input into a PLL 82 that generates a phase-locked signal with constant frequency. The signal with variable frequency generated by the DDS 80 is mixed with the signal of constant frequency in a mixer 84 in order to generate the detection clock signal 38, i.e. the variable sampling cycle. A filter 86 is provided in order to suppress unwanted mixer products.

Figure 11E:
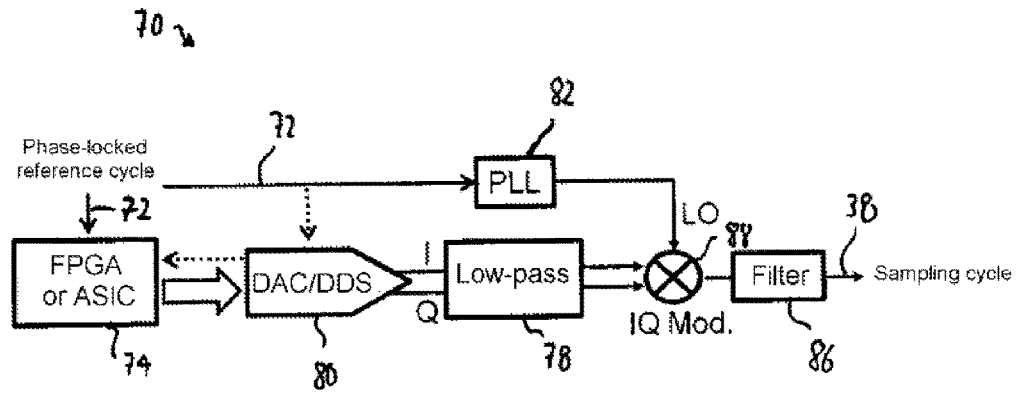

Alternatively, an IQ modulator 88—of the type illustrated in FIG. 11e—may also be used instead of the mixer 84, wherein two variations that are phase-shifted by 90° are in this case generated from the variable clock signal in the DDS 80 and coupled into an IQ modulator 88 via a low-pass filter 78.

Variations, in which the sweep control signal 30 and the detection clock signal 38 are always phase-locked, were discussed in the preceding description. As mentioned above, however, the improved OCT system according to the invention can also be operated with sweep control and detection clock signals 30, 38 that are not phase-locked in the proper sense of the word as long as the relative phase position and the precise frequency ratio of the two signals are known. In this case, the measured data can be digitally corrected in order to realize the precise correlation between the frequency sweep and the interference signal 34 with consideration of the phase position. To this end, the present invention proposes means for generating a signal or a signal sequence that respectively is characteristic for the frequency ratio and/or the relative phase position of the sweep control signal and the detection clock signal.

Figure 12A:
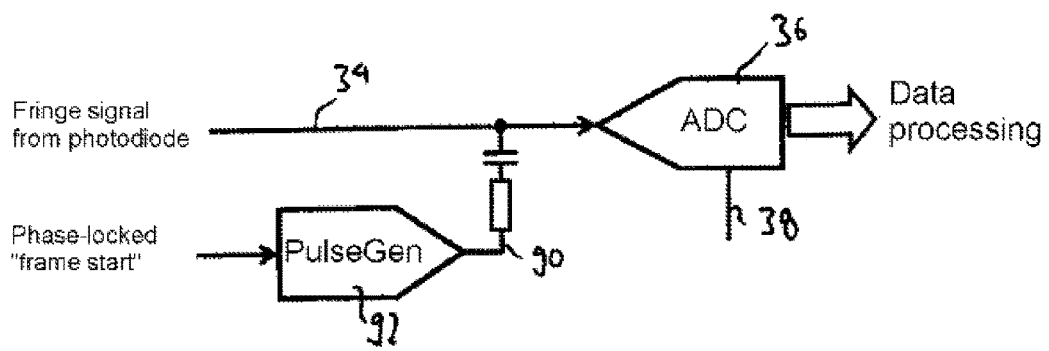
FIGS. 12a-b show an arrangement for generating and coupling a start pulse into the detection device.
Figure 12B:
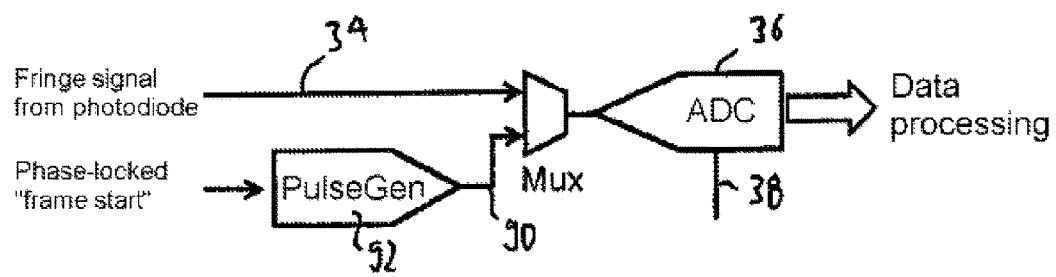
Figure 12C:
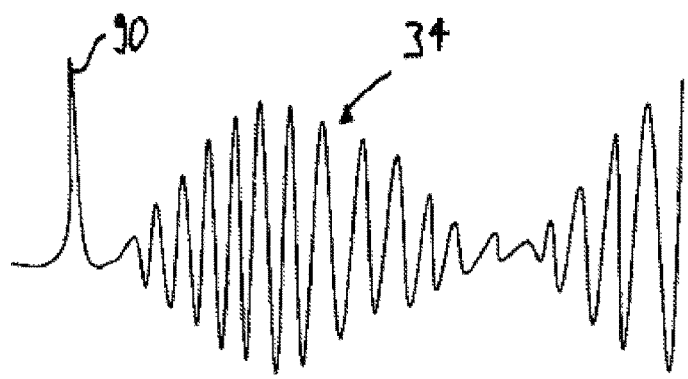
FIG. 12c shows a schematic representation of the start pulse and part of the interference signal that are applied to the input of the detection device.

One such example is illustrated in FIGS. 12a, 12b and 12c. In order to determine the phase position between the sweep control signal 30 and the detection clock signal 38, a pulse signal 19 that is also referred to as "start pulse" below (see FIG. 12c) is generated by a pulse generator 92 and coupled into the same input of the detection device 36 (A/D converter) as the interference signal 34. Two potential variations for coupling the start pulse 90 into the A/D converter 36 are illustrated in FIGS. 12a and 12b. In this case, the start pulse 90 is phase-locked with the (not-shown) sweep control signal 30. Since this start pulse 90 is sampled with the detection clock signal 38, the phase position between the detection clock signal 38 and the start pulse 90 can be precisely determined.

It is furthermore possible to use a sequence of start pulses 90 that is also phase-locked with the sweep control signal 30. The frequency ratio between the sweep control signal 30 and the detection clock signal 38 can also be determined in this way.

It should be noted that a start pulse 90, which is sampled with the detection clock signal 38 and phase-locked with the sweep control signal 30, results in a signal that is characteristic for the relative phase position of the sweep control signal 30 and the detection clock signal 38. If a sequence of several such start pulses 90 is sampled with the detection clock signal 38, the resulting signal sequence is characteristic for the frequency ratio of the sweep control signal 30 and the detection clock signal 38. Other variations are conceivable as long as a signal or a signal sequence that contains information on the phase position and/or the frequency ratio is generated.

Figure 1:
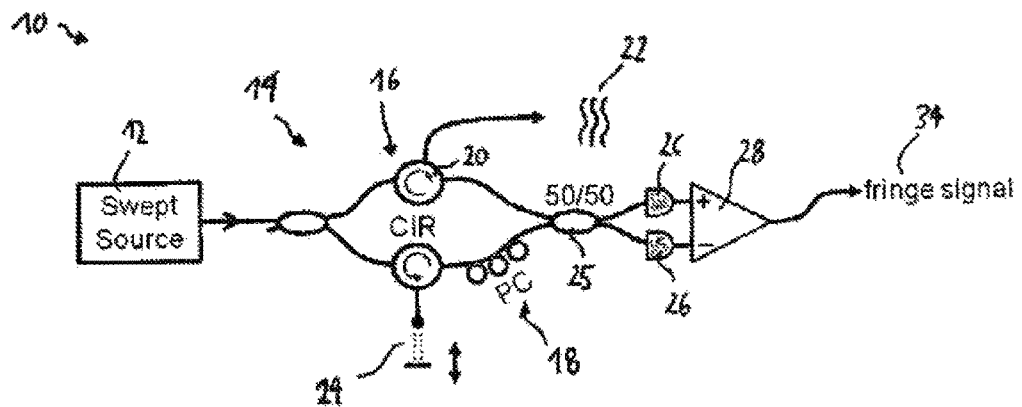
FIG. 1 shows a schematic representation of a swept-source OCT system.

In the exemplary embodiment shown, the start pulses 90 are respectively generated at the beginning of a frame, i.e. before the interference data 34 is received from the photodiode 26 (see FIG. 1). This is indicated in FIG. 12c in that the start pulse 90 and a subsequent interference signal 34 shown correspond to the first ones within a sweep.

It should be noted that the phase information obtained from the start pulse 90 sampled with the detection clock signal 38 cannot be delivered by the mere input of a trigger such as the trigger 66 in FIG. 7, not even if this trigger should be phase-locked with the sweep control signal 30, because the relative timing of the trigger and the A/D converter 36 can be defined only up to one sampling period of the A/D converter 36, and in many A/D converters or data acquisition cards only with a precision of several sampling periods. Although the uncertainty in time between the trigger 66 and the A/D converter 36, which can also be referred to as "trigger jitter," may appear insignificant at first glance, the inventors have surprisingly determined that this can nevertheless lead to quite significant flaws in the images. However, if a signal that is phase-locked with the sweep control signal 30 such as, for example, the start pulse 90 is sampled over several sampling periods, the relative phase position can be determined with an accuracy that lies below one sampling period of the A/D converter 36, for example, by fitting the sampled signal with the expected pulse shape.

If the sweep control signal and the detection clock signal 30, 38 are not phase-locked, the time between the trigger and the detection clock signal 38 may be alternatively measured, for example, with a time-to-time digital converter (TDC). Its output would be another example of a signal that is characteristic for the relative phase position of the sweep control signal 30 (if the trigger is derived therefrom) and the detection clock signal 38.

Although preferred exemplary embodiments are respectively illustrated and elucidated in detail in the drawings and the preceding description, this should be interpreted in a mere exemplary rather than a restrictive sense. It should be noted that only the preferred exemplary embodiments are illustrated and described, and that changes and modifications, which currently and in the future fall under the scope of the claims, shall also be protected. The above-described characteristics may be important in any combination.

LIST OF REFERENCE SYMBOLS

10 Swept-source OCT system
12 Tunable light source
14 Interferometer
16 First arm of interferometer 14
18 Second arm of interferometer 14
20 Circulator
22 Sample
24 Delay loop
25 50/50 coupler
26 Photodiode
28 Differential amplifier
30 Sweep control signal
31 Light source unit
32 Oscillator
33 Feedback
34 Interference signal
36 AD converter
38 Detection clock signal
40 Oscillator
41 Data acquisition unit
42 Digital data
44 k-clock interferometer
46 Phase-locked loop
48 Reference oscillator
50 Scan control signal
52 First PLL
54 RAMDAC
56 Second PLL
58 Imaging control
60 First frequency divider
62 RAMDAC
64 Second frequency divider
66 Trigger
68 k-clock generator
70 Synthesizer
72 Phase-locked reference signal
74 FPGA/ASIC
76 D/A converter
78 Low-pass filter
80 DDS
82 PLL
84 Mixer
86 Filter
88 IQ modulator
90 Start pulse
92 Pulse generator

The invention claimed is:

1. A swept-source optical coherence tomography(OCT) system comprising:
a sweep control signal generator configured to generate an electronic sweep control signal for operating a tunable light source such that the tunable light source carries out wavelength sweeps with a repetition rate, $f_{sweep}$, that is dependent on the frequency of the sweep control signal in response to the sweep control signal, and
a detection device for the time-resolved detection of an interference signal of a sample beam and a reference beam with the aid of an electric detection clock signal, wherein the sweep control signal and the detection clock signal are phase-locked, without use of an optical k-clock,
by deriving one of the signals from the other signal or by deriving both signals from a common source signal, or
by using a signal generator to generate a signal or a signal sequence that is respectively characteristic of at least one of (i) a frequency ratio or (ii) a relative phase position of the sweep control signal and the detection clock signal.

2. The swept-source OCT system according to claim 1, in which the detection device is configured for sampling the interference signal with the cycle of the detection clock signal.

3. The swept-source OCT system according to claim 2, in which the detection device comprises an AD converter configured to receive the detection clock signal and convert the interference signal into digital data at points in time that are defined by the detection clock signal.

4. The swept-source OCT system according to claim 1, in which the repetition rate $f_{sweep}$ of the tunable light source is at least 50 kHz to at least 1.4 MHz.

5. The swept-source OCT system according to claim 1, in which the tunable light source is a buffered light source, such that successive wavelength sweeps are carried out without time gap, wherein the system is configured to generate
(i) a data frame comprising the detection data of a plurality of wavelength sweeps or
(ii) a data volume comprising a plurality of data frames in the form of one continuous data stream.

6. The swept-source OCT system according to claim 1, in which the system furthermore comprises a scanning device configured to scan the sample beam over a sample,
wherein the scanning device is configured to receive a scan signal that is phase-locked with the sweep control signal and the detection clock signal, wherein the scanning device is configured to scan the sample beam in response to the scan signal.

7. The swept-source OCT system according to claim 5, further comprising a circuit for generating said sweep control signal, said detection clock signal and said scan signal, and that is further designed for generating a data frame start signal or a data volume start signal that is synchronized (i) with the position of the scanning device or (ii) with the scan signal and phase-locked with the sweep control signal.

8. The swept-source OCT system according to claim 5, in which the tunable light source is a buffered light source that is designed for carrying out a primary sweep and one or more buffered sweeps, and in which the data frame start signal or the data volume start signal is synchronized with one certain sweep of these sweeps.

9. The swept-source OCT system according to claim 1, further comprising a feedback between the tunable light source and the sweep control signal generator for stabilizing the coherence characteristics of the light source against environmental influences.

10. The swept-source OCT system according to claim 1, wherein the system is configured such that realizing the fixed phase relation between the sweep control signal and the detection clock signal is achieved from one or more of:
(a) the detection clock signal being generated from the sweep control signal with the aid of a phase-locked loop (PLL), wherein the frequency of the detection clock signal amounts to a multiple, of the frequency of the sweep control signal,
(b) a signal, the frequency of which is a multiple of the frequency of the sweep control signal, and wherein the sweep control signal is generated by frequency division and the detection clock signal is generated by frequency multiplication with the aid of the PLL, or (c) the sweep control signal is derived from the detection clock signal by frequency division.

11. The swept-source OCT system according to claim 1, furthermore comprising a k-clock generator for generating a k-clock electronically based on an input signal that is phase-locked with the sweep control signal, wherein the electronically generated k-clock signal serves as detection clock signal for the detection device.

12. The swept-source OCT system according to claim 11, in which the k-clock generator comprises a synthesizer that is connected for receiving the input signal phase-locked with the sweep control signal and suitable for generating the k-clock signal digitally, wherein the synthesizer comprises one or more of:
a FPGA or an ASIC that receives the input signal phase-locked with the sweep control signal and generates the k-clock signal or a precursor signal thereof from said input signal,
a DDS that receives the input signal phase-locked with the sweep control signal and is connected to an ASIC or a FPGA to receive frequency information for generating the k-clock therefrom,
a mixer that mixes the input signal phase-locked with the sweep control signal with a signal of variable frequency to generate the k-clock signal or a precursor signal thereof,
an IQ modulator that modulates the input signal phase-locked with the sweep control signal with two signals of variable frequency that are phase-shifted by 90°, and
a low-pass filter in the region of the output of the synthesizer.

13. The swept-source OCT system according to claim 1, comprising a memory in which data for a recalibration or for a resampling of the detected interference signal is stored.

14. The swept-source OCT system according to claim 13, in which the data contains points in time for supporting points, at which the interference signal is determined by interpolating the interference signal measured with the aid of the detection clock signal of the detection device, wherein the points in time are chosen such that the sampling points are equidistant in the optical frequency of the interference signal.

15. The swept-source OCT system according to claim 1, the system further comprising:
a reference signal generator for generating a reference signal, that is phase-locked with the sweep control signal or a sequence of such reference signals; and
a coupler configured to couple the reference signal or the sequence of reference signals into the input of the detection device.

16. The swept-source OCT system according to claim 15, wherein the sweep control signal generator comprises a phase-locked loop circuit and the phase-locked loop circuit is configured to determine at least one of the frequency ratio or the relative phase position between the sweep control signal and the detection clock signal from the reference signal or the reference signal sequence detected with the aid of the detection clock signal.

17. A swept-source OCT system according to claim 1, wherein the system is configured for photoacoustic detection.

18. A method for generating OCT images in a swept-source OCT system, the method comprising:
controlling a tunable light source by an electronic sweep control signal such that the tunable light source carries out wavelength sweeps of an optical signal with a repetition rate $f_{sweep}$ that is dependent on the frequency of the sweep control signal, and in which an interference signal of a sample beam and a reference beam is detected in a detection device with the aid of a detection clock signal; and
phase-locking the sweep control signal and the detection clock signal without using an optical k-clock by deriving one of the signals from the other signal, or by deriving both signals from a common source signal, or
generating a signal or a signal sequence that is respectively characteristic for at least one of a frequency ratio or a relative phase position of the sweep control signal and the detection clock signal.

19. The swept-source OCT system according to claim 1, wherein the sweep control signal generator is an oscillator.

20. The swept-source OCT system according to claim 1, wherein the sweep control signal generator is a phase-locked loop circuit.

* * * * *

UNITED STATES PATENT AND TRADEMARK OFFICE
CERTIFICATE OF CORRECTION

PATENT NO.        : 9,784,559 B2
APPLICATION NO.   : 14/386672
DATED             : October 10, 2017
INVENTOR(S)       : Robert Alexander Huber et al.

It is certified that error appears in the above-identified patent and that said Letters Patent is hereby corrected as shown below:

On the Title Page

At item (71), Line 1, "Ludwig Maximilians Universität," should be
-- Ludwig-Maximilians-Universität München, --.

At item (74), Line 1, "Gernstein" should be -- Gerstein --.

In the Claims

At Column 18, Line 28, "sweeps or" should be -- sweeps, or --.

At Column 19, Lines 1-2, "division and" should be -- division, and --.

At Column 20, Line 19, "A swept-source" should be -- The swept-source --.

Signed and Sealed this
Twenty-seventh Day of March, 2018

Andrei Iancu
*Director of the United States Patent and Trademark Office*